United States Patent [19]
Swanson et al.

[11] Patent Number: 5,737,002
[45] Date of Patent: *Apr. 7, 1998

[54] TWO MATERIAL FRAME HAVING DISSIMILAR PROPERTIES FOR THERMAL INK-JET CARTRIDGE

[75] Inventors: David W. Swanson, Escondido; Mindy A. Hamlin; James G. Salter, both of San Diego, all of Calif.

[73] Assignee: Hewlett-Packard Company, Palo Alto, Calif.

[*] Notice: The term of this patent shall not extend beyond the expiration date of Pat. No. 5,515,092.

[21] Appl. No.: 641,408

[22] Filed: May 1, 1996

Related U.S. Application Data

[60] Division of Ser. No. 994,807, Dec. 22, 1992, Pat. No. 5,515,092, which is a continuation-in-part of Ser. No. 853,372, Mar. 18, 1992, Pat. No. 5,464,578.

[51] Int. Cl.[6] ................................................. B41J 2/175
[52] U.S. Cl. .......................................................... 347/86
[58] Field of Search ........................... 347/85–87; 220/611

[56] References Cited

U.S. PATENT DOCUMENTS

| | | | |
|---|---|---|---|
| 2,609,570 | 9/1952 | Danielson et al. | 264/274 |
| 4,119,034 | 10/1978 | Wax | 101/366 |
| 4,385,025 | 5/1983 | Salerno et al. | 264/255 |
| 5,047,790 | 9/1991 | Cowger et al. | 347/87 |
| 5,280,300 | 1/1994 | Fong et al. | 347/87 |
| 5,325,119 | 6/1994 | Fong | 347/86 |
| 5,359,353 | 10/1994 | Hunt et al. | 347/86 |

FOREIGN PATENT DOCUMENTS 2137922  10/1984  United Kingdom.

OTHER PUBLICATIONS

Search Report Dated Apr. 29, 1994, For European Patent 93114954.6.

*Primary Examiner*—Benjamin R. Fuller
*Assistant Examiner*—Judy Nguyen

[57] ABSTRACT

A thermal ink-jet pen cartridge having a rigid external frame member fabricated of a rigid engineering plastic, and an interior frame structure attached thereto, formed of a softer, more ductile plastic material than an engineering plastic. An ink reservoir is defined by the interior structure and a pair of flexible bag membranes formed of a plastic material impervious to the ink and compatible with the interior member material, allowing the membranes to be joined to the interior member to form a leak-proof joint. The external structure has locking features formed into an interior surface. When the interior member is injection molded to the external member, the molten material flows into and around the locking features, securing the interior member to the external member and resisting the shrinkage forces as the molten material cools. The ink reservoir is filled through a fill port passageway extending through the external frame member and the inner member. The passageway is lined with the softer material of the inner member, and is sealed by an oversized ball press fit into the passageway after the ink filling process.

21 Claims, 11 Drawing Sheets

TWO MATERIAL FRAME HAVING DISSIMILAR PROPERTIES FOR THERMAL INK-JET CARTRIDGE

BACKGROUND OF THE INVENTION

This is Divisional of application Ser. No. 07/994,807 filed Dec. 22, 1992, U.S. Pat. No. 5,515,092 which is a continuation-in-part of commonly assigned application Ser. No. 07/853,372 now U.S. Pat. No. 5,464,578, filed Mar. 18, 1992, entitled COMPACT FLUID COUPLER FOR THERMAL INKJET PRINT CARTRIDGE INK RESERVOIR by James G. Salter, et al., the entire contents of which are incorporated herein by this reference.

The present invention is related to the following pending and commonly assigned U.S. patent applications: INK PRESSURE REGULATOR FOR A THERMAL INK-JET PRINTER, Ser. No. 07/928,811, filed Aug. 12, 1992, by Tofigh Khodapanah et al.; COLLAPSIBLE INK RESERVOIR STRUCTURE AND PRINTER INK CARTRIDGE, Ser. No. 07/929,615, filed Aug. 12, 1992, by George T. Kaplinsky et al.; COMBINED FILTER/AIR CHECK VALVE FOR THERMAL INK-JET PEN, by George T. Kaplinsky, Ser. No. 07/995,109, filed Dec. 22, 1992; DOUBLE COMPARTMENT INK-JET CARTRIDGE WITH OPTIMUM SNOUT, by David W. Swanson et al., Ser. No. 07/995,221, filed Dec. 22, 1992; THERMAL INK-JET PEN WITH A PLASTIC/METAL ATTACHMENT FOR THE COVER, by Dale D. Timm, Jr. et al., Ser. No. 07/994,810 filed Dec. 22, 1992; THIN PEN STRUCTURE FOR THERMAL INK-JET PRINTER, by David W. Swanson et al., Ser. No. 07/994,809 filed Dec. 22, 1992, RIGID LOOP CASE STRUCTURE FOR THERMAL INK-JET PEN, by David W. Swanson et al., in lieu thereof Ser. No. 07/994,808, filed Dec. 22, 1992; SPRING-BAG PRINTER INK CARTRIDGE WITH VOLUME INDICATOR, by David S. Hunt et al., application Ser. No. 07/717,735, filed Jun. 19, 1991; the entire disclosures of which are incorporated herein by this reference.

This invention relates to ink reservoirs for thermal ink-jet ("TIJ") print cartridges.

TIJ technology is widely used in computer printers. Very generally, a TIJ includes a print head typically comprising several tiny controllable ink-jets, which are selectively activated to release a jet or spray of ink from an ink reservoir onto the print media (such as paper) in order to create an image or portion of an image. TIJ printers are described, for example, in the Hewlett-Packard Journal, Volume 36, Number 5, May, 1985, and Volume 39, Number 4, August, 1988.

SUMMARY OF THE INVENTION

In accordance with one aspect of the invention, a printer ink cartridge including an ink reservoir includes a frame structure comprising an external frame structural member fabricated from a first rigid plastic material and an interior frame member fabricated from a second plastic material having properties dissimilar to properties of the first plastic material, in that the second material is softer and more ductile. First and second impervious membranes formed of a third material are joined to the interior frame member to form, with that member, the ink reservoir. The second plastic material is compatible with the third plastic material to permit a leak-proof joinder of the membranes to the interior frame member. Preferably the second plastic material and said third plastic material are compatible such that said membranes can be sealed to said inner frame member by application of heat and pressure.

In accordance with another aspect of the invention, the external frame member comprises an inner surface to which the interior member is attached, the inner surface including a plurality of locking features formed therein. The interior member is formed by injection molding of the second plastic material in a molten state, the second plastic material being characterized by a shrinkage rate upon cooling thereof. During the injection molding, the molten material flows around the locking features of the external frame member. When the molten material cools, the inner frame member is locked to the external frame member at the locking features.

The locking features preferably include a protruding rib extending from the surface of the external member, defined by undercut sides, wherein during the injection molding, the molten second plastic material flows around the rib and against the undercut sides.

In accordance with another aspect of the invention, the pen further includes an ink fill port comprising a passageway extending through the external frame member and the interior member in communication with the ink reservoir, and means for sealing said passageway. Preferably, the passageway is lined with the second material, and the sealing means is a ball slightly larger in cross-section than the diameter of the passageway. The ball is press-fit into the passageway to seal it.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

FIGS. 1–17 illustrate a thermal ink-jet pen cartridge 50 embodying the present invention. The pen 50 comprises an external frame structure 60 which defines a closed band or loop defining the periphery of the pen 50. The pen structure 60 comprises two chemically dissimilar plastic members 78 and 68. The external plastic member 78 is molded from a relatively rigid engineering plastic such as a glass-filled modified polyphenylene oxide, such as the material marketed under the trademark "NORYL" by General Electric Company. An inner plastic member 68 is injection molded to the inner periphery of the external plastic member 78, and is fabricated of a plastic material suitable for attaching the ink reservoir membranes 64 and 66. A plastic suitable for the inner plastic member 68 is a polyolefin alloy or 10 percent glass-filled polyethylene.

Figure 1:
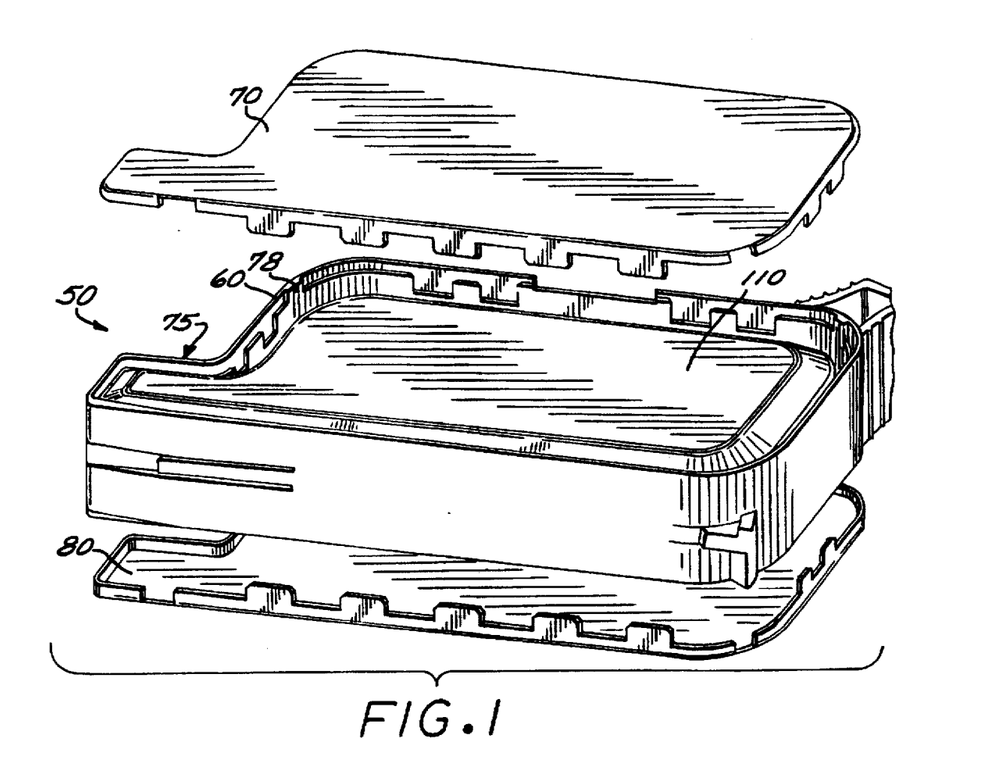
FIG. 1 is an isometric view of a thermal ink-jet pen cartridge embodying the invention, shown with its covers in an exploded form.
Figure 2:
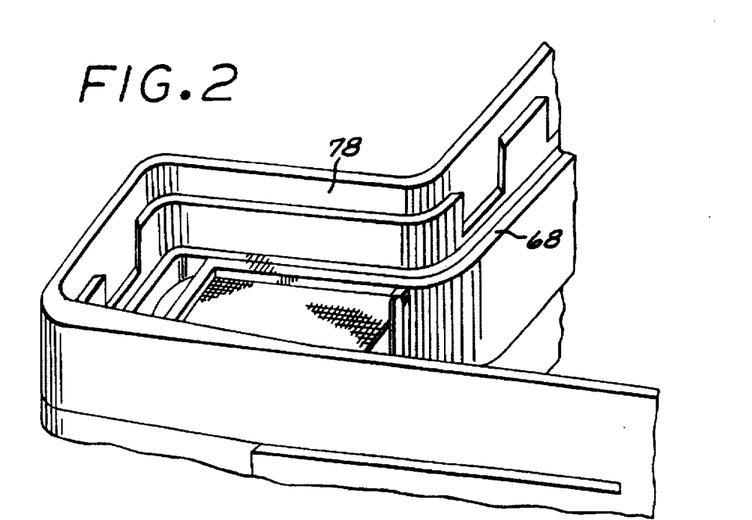
FIG. 2 is an enlarged view of the snout region of the pen of FIG. 1.
Figures 3, 4, 5:
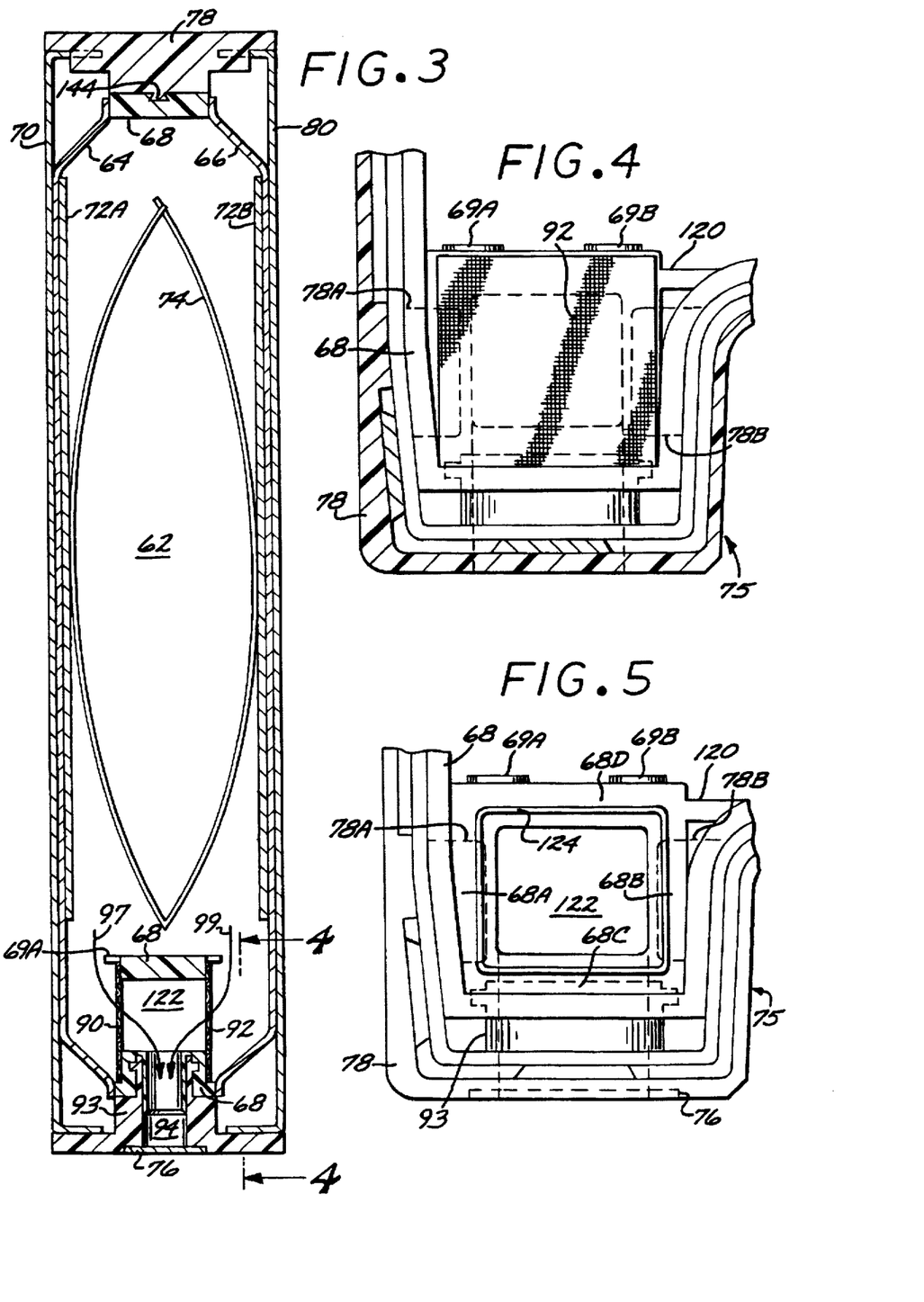
FIG. 3 is a cross-sectional view of the pen of FIG. 1, taken lengthwise through the pen snout region.
FIG. 4 is a broken away cross-sectional view of the snout region of the pen of FIG. 1.
FIG. 5 is a view of the snout region of the pen of FIG. 1, taken prior to installation of the air check valve.

The frame 60 defines a generally rectilinear open volume region 110 and a snout region 75 protruding from one corner of region 110. The external plastic member 78 is molded to form a standpipe 93 with an interior opening or channel 94 formed therein. The standpipe channel 94 communicates with a TIJ printhead 76 secured across the external end of the snout opening 94. Ink flows through the standpipe channel 94 to supply the printhead 76 with ink. As drops of ink are forced outwardly through the printhead nozzles, ink flows through the standpipe 94 from the reservoir 62 via the fluid paths indicated generally by arrows 97 and 99 to replenish the ink supply available to the printhead 76.

The inner plastic member 68 further includes a support rib 120 which extends across the throat of the snout region 75, separating the snout region from the main ink reservoir area 62. A generally rectangular chamber area 122 is formed by a surrounding structure of the inner member 68 extending between the rib 120 and the inner opening of the standpipe channel 94.

First and second membranes 64 and 66 are attached to the inner plastic member 68 through heat staking, adhesives or other bonding processes, to form a leak-proof seal between the inner plastic member 68 and the membranes. The membranes 64 and 66 are formed of a material which is impermeable to the ink to be stored within the ink reservoir, and compatible with the plastic of material from which the inner plastic member 68 is fabricated. A preferred material for the membranes 64 and 66 is ethylene-vinyl acetate (EVA). The ink delivery system includes a spring 74 which applies a separating force against two opposed piston plates 72A and 72B inside the ink reservoir to separate the membranes 64 and 66. The spring and piston elements maintain negative pressure on the ink in the reservoir to keep the ink from drooling from the printhead 76. As ink is consumed from the reservoir, atmospheric pressure on the membranes 64 and 66 result in compression of the spring with the plates 72A and 72B drawn toward each other.

The membranes 64 and 66 extend over the standpipe region, and in this embodiment are heat staked along the edge regions 68A, 68B and 68C (FIG. 4) to maintain the sealing of the membranes along the periphery of the snout region 75. The membranes 64 and 66 are not sealed to the region of the rib 120. Standoffs 69A and 69B comprising the inner plastic member 68 hold the membranes off the area of rib 120, to ensure the membranes do not sag against the support rib structure and thereby close off the ink flow from the ink reservoir to the standpipe 93.

An air check valve is provided in the fluid path between the printhead 76 and the ink reservoir 62, to prevent air bubbles from travelling from the printhead into the reservoir 62. The valve also serves the function of a filter to prevent particulate contaminates from flowing from the ink reservoir 62 to the printhead 76 and clogging the printhead nozzles. In this embodiment, the valve includes two valve members 90, 92 one on each side of the frame. The valve members 90 and 92 each comprise, in this exemplary embodiment, a section of finely woven stainless steel mesh, the edges of which are attached to the inner plastic member. The mesh has a nominal passage dimension of 15 microns between adjacent mesh strands, and has a typical thickness of less than 0.005 inches. In this embodiment, each mesh member 90 and 92 is square, and covers an area of about one centimeter by one centimeter. A mesh marketed under the tradename RIGIMESH-J by Engle Tool and Die, Eugene, Oreg., is suitable for performing the function of the check valve. The mesh passage size is sufficiently small that, while ink may pass through the passages of the mesh, air bubbles under normal atmospheric pressure will not pass through the mesh passages which are wetted by the ink. The required air bubble pressure necessary to permit bubbles to pass through the mesh, in this embodiment, about 30 inches of water, is well above that experienced by the pen under any typical storage, handling or operational conditions. As a result, the mesh serves the function of an air check valve for the pen.

A second function fulfilled by the mesh valve is that of a particulate filter, preventing particles as small as 15 microns from passing through the mesh. It is known to use a mesh of this mesh opening size in a particulate filter in vented, foam-filled ink reservoirs. Such reservoirs have no need for an air check valve.

There is a pressure drop across the mesh members 90 and 92. If the mesh opening size is too small, not enough ink will flow through the mesh, and the printhead will starve. Two separate mesh members 90 and 92 are employed to ensure sufficient ink flow from the reservoir 92 into the chamber 94.

FIGS. 4 and 5 illustrate the snout region 75 of the pen 50. FIG. 4 is a cross-section taken along line 4—4 of FIG. 3. FIG. 5 is a view of the snout without the covers and valve element 90 and 92 in place. The frame member 78 includes a pair of inwardly facing tabs 78A and 78B which provide support to the portion of inner frame member 68 molded around the inner periphery of the snout region 75. The tabs 78A and 78B also serve as coring features for molding of the inner member 68. The frame member 68 defines inner chamber 122, with a rectilinear frame portion extending around the periphery of the chamber. The frame portion is defined by side regions 68A–D. As shown in FIG. 3, the width of member 68 defines the width of the chamber 122. The side regions 68A–D thus define a window into the chamber 122 on each cover-facing side of the member 68. Each side of the chamber 122 which extends in a perpendicular sense to the plane of the covers 70 and 80 is defined by the plastic comprising member 68.

During operation, air bubbles may accumulate in the chamber 122. The printer in which the pen 50 is installed may include a priming station to apply a vacuum to the printhead to withdraw the air bubbles through the printhead, and draw ink from the reservoir to fill the standpipe opening and the chamber 122. Such priming stations are known in the art.

The frame member 68 is molded to define a thin lip 124 which protrudes from the side regions 68A–D and extends around the periphery of the frame portion. Such a lip is defined on each cover-facing side of the member 68; only lip 124 is visible in FIG. 5. During the heat staking operation used to attach the mesh screen members the heated die member is positioned over the mesh member, and brought downwardly against the mesh member with force. The temperature of the die member is sufficient to soften or melt the plastic material defining the lip 124, so that some of the molten plastic flows into the adjacent interstices of the mesh. Upon removal of the die member and cooling of the plastic, the mesh member is firmly attached to the member 68 all around the periphery of the window into the chamber 122.

Figure 6:
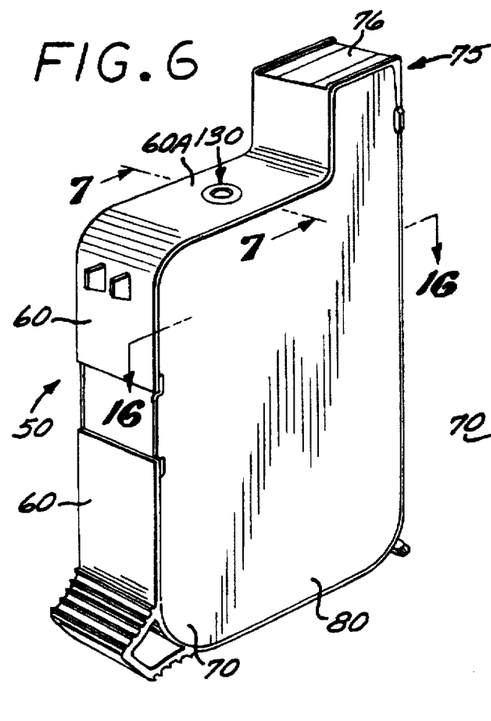
FIG. 6 is an isometric view of the thermal ink-jet pen cartridge of FIG. 1.

FIGS. 6–9 illustrate the location and structure of the ink fill port 130 of pen 50. As shown in FIG. 6, in this embodiment, the fill port 130 is located in a flat surface 60A of the frame 60 adjacent the pen snout region 75. The ink reservoir 62 is filled with ink via the port 130, which is thereafter sealed off by insertion of a stainless steel ball 132.

Figure 7:
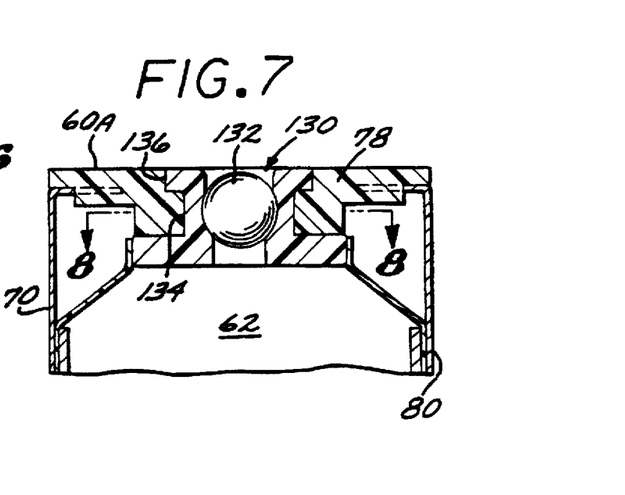
FIG. 7 is a cross-sectional view taken along line 7—7 of FIG. 6.
Figure 8:
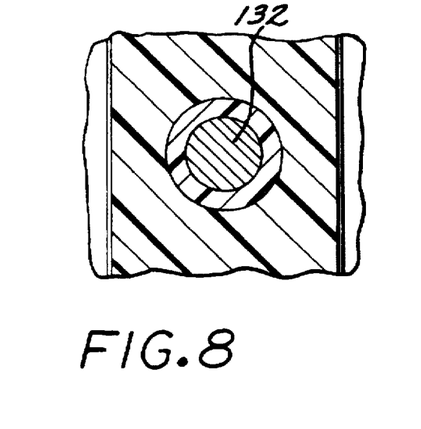
FIG. 8 is a cross-sectional view taken along line 8—8 of FIG. 7.
Figure 9:
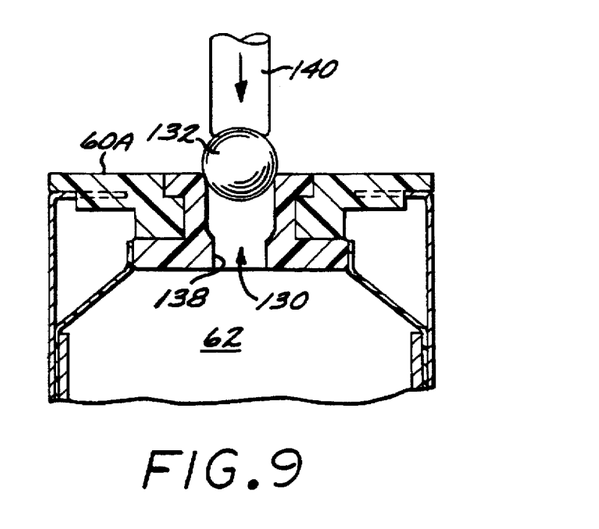
FIG. 9 is a cross-sectional view similar to FIG. 7 but showing the insertion of the sealing ball.

The external frame member 78 is molded to form an opening of circular cross-section, whose diameter transitions abruptly from a smaller diameter in the region 134 in which the ball 132 is captured, to a larger diameter in the region 136 adjacent the surface 60A. In this embodiment, the ball 132 has a diameter of 0.187 inches (4.76 mm), the smaller diameter of the frame member 78 in the region 134 is 0.236 inches (6.0 mm), and the larger diameter of the frame 78 in the region 136 is 0.283 inches (7.2 mm).

During the molding of the inner plastic member 68 onto the previously fabricated outer frame member 78, the molten plastic flows through the opening formed for the ink fill port in the member 78 and around a mold pin inserted therein to form the fill port structure comprising the inner member 68. Thus, the molten plastic flows around the material forming the member 78 at region 134, providing a lining thereover. Moreover, the inner member 68 thus formed defines the fill port opening 130 which communicates with the ink reservoir 62. The diameter of the fill port opening 130 tapers from a first diameter of the opening adjacent the surface to a second, smaller diameter at 138 adjacent the reservoir 62 which is substantially smaller than the diameter of the ball 132. In this exemplary embodiment, the first diameter is 0.179 inches and the second diameter is 0.120 inches.

To fill the reservoir 62, the pen is held with the snout region 75 in an upright position as shown in FIG. 6. A needle is lowered through the fill port opening 130 down into the ink reservoir nearly touching the bottom of the reservoir. This is done so that the ink falls the shortest distance possible, as some inks will foam if they fall, which makes priming difficult later. The pen reservoir is then filled with ink through the ink fill needle by a pumping means to the point that the ink in the reservoir is nearly touching the inside of the ink fill hole. At this point the needle is drawn out of the pen and a ball 132 is placed over the ink fill opening 130. The ball fits tightly within the opening 138, as it must displace some of the plastic material surrounding the opening 130, due to its size relative to the opening size. The ball 130 is then pressed into the ink fill 130B by a pressing tool 140 (FIG. 9) such that it just touches the inner diameter at 138 at the bottom of the ink fill opening 130. At this point the ink is contained in the pen reservoir; however, an air path exists from the top of the free surface of the ink through the printhead nozzles which must be removed to establish the initial pen back pressure.

The air is pulled from the pen with the pen 50 tilted on a 30 degree angle such that the highest point is the snout region 75. This is done because the air will float to the highest point which then is the snout region, and thereby facilitating pulling the air from the pen by the primer. A suction head is then placed over the nozzle region of the thermal ink-jet head and vacuum pulled. As the vacuum removes air from the pen and the ink level will rise, wet out the filter, and eventually make its way up to and through the printhead nozzles. This process has been characterized such that a known amount of ink will be pulled through the nozzles to establish the initial back pressure in the pen at −1 inch of water. After the pen is primed, the top surface of the printhead is washed with clean water and an air knife to remove any excess ink from the priming process. After the pen has been primed it, of course, may be turned in any orientation with the ink remaining in the pen.

Figure 10:
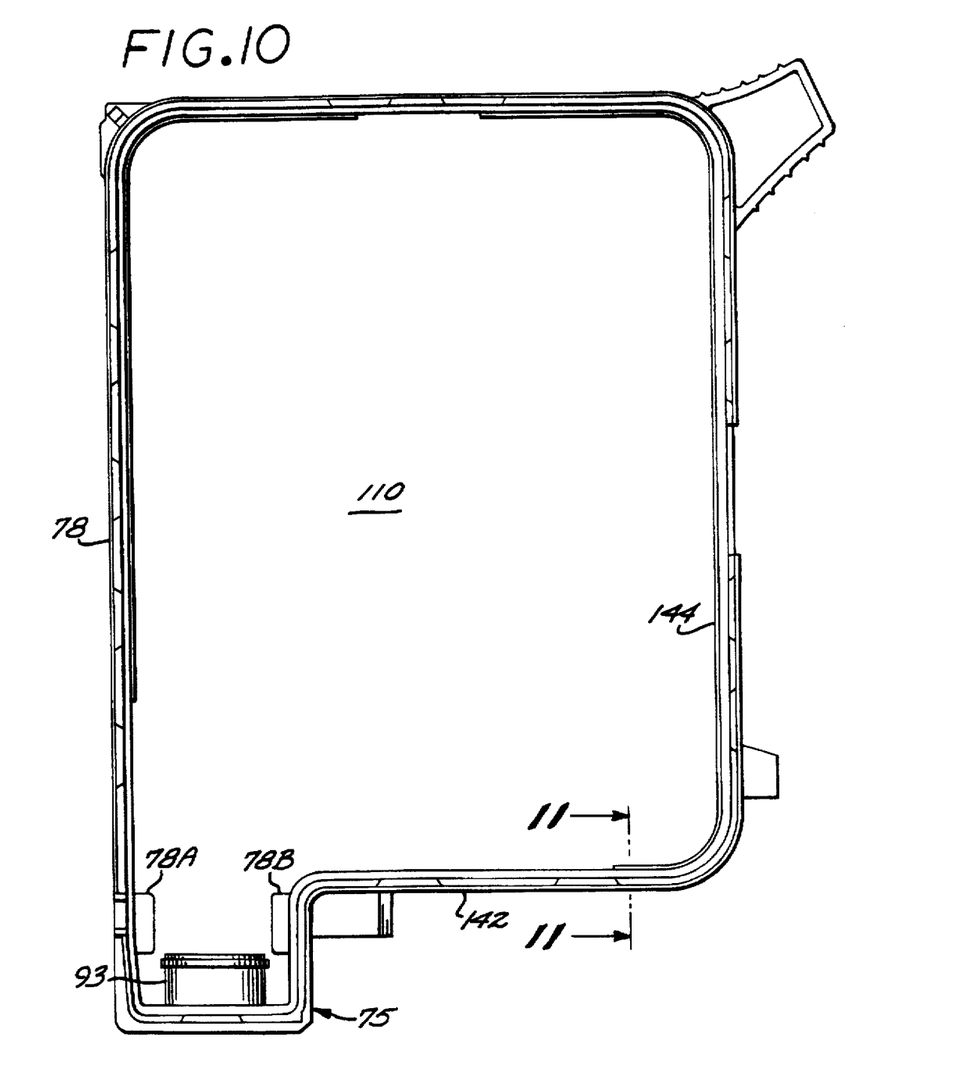
FIG. 10 is a side view of the external plastic frame member comprising the pen cartridge of FIG. 1.
Figure 11:
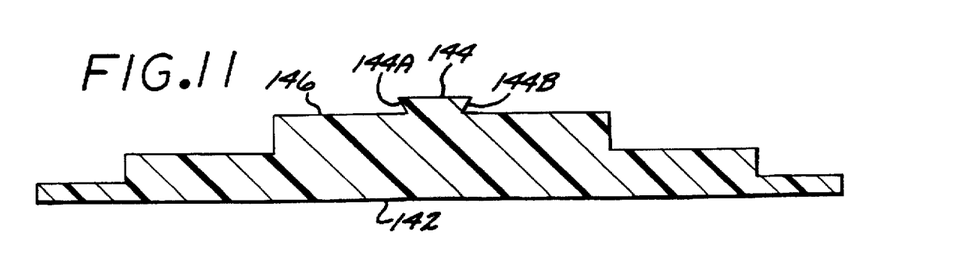
FIG. 11 is a cross-sectional view taken along line 11—11 of FIG. 10.

FIGS. 10 and 11 show in isolation the outer plastic member 78 comprising the pen 50. In particular, it can be seen in FIG. 11 that the plastic member 78 presents an exterior flat surface 142, but that the inner side of member 78 presents several steps to increase the thickness of member 78, forming a plateau 146. A rib feature 144 is formed along the center of the member 78 extending from plateau 146, and includes undercut sides 144A and 144B. The rib 144 extends along part or nearly all of the sides of the frame member 78, as shown in FIG. 10.

Figure 12:
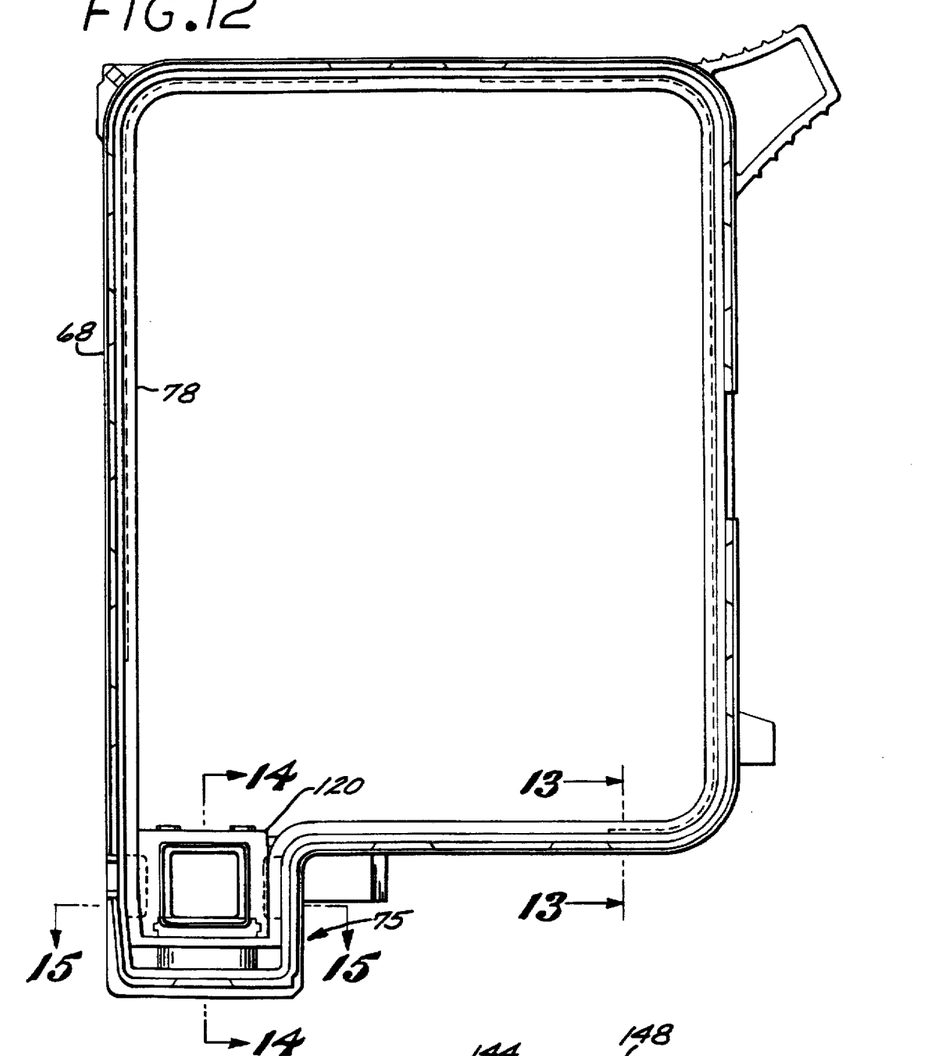
FIG. 12 is a side view of the external and inner plastic frame members comprising the pen cartridge of FIG. 1.
Figure 13:
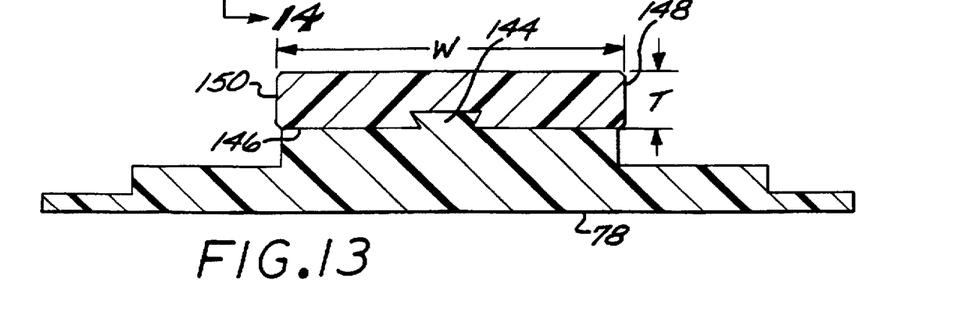
FIG. 13 is a cross-sectional view taken along line 13—13 of FIG. 12.

FIG. 12 is a side elevation view corresponding to FIG. 10, but showing the inner frame member 78 molded onto the outer frame member 78. The frame member 78 extends along the plateau 146, and covers the rib 144. The undercut sides of the rib provide a locking means for locking the member 68 onto the member 68. In this embodiment, the member 68 has a thickness T (0.059 inches) and a width W (0.354 inches) in the area shown in FIG. 13. The sides 148 and 150 of the member 68 which extend generally perpendicular to the frame member 78 provide surfaces to which the ink reservoir membranes 64 and 66 may be attached.

The material forming the inner member 68 has a shrink rate as it cools from the molten state. This material is molded inside the outer frame 78 and tends to shrink away from the frame 78 as it cools. To keep the inner plastic member 68 attached to the exterior frame member 78, it is molded onto the undercut features 144 which are molded as part of the member 78. As the material forming member 68 cools, it locks onto the external frame 78 by these features 144, thereby countering the forces of the material forming member 68 to pull away from the external frame 78 due to the shrinkage of that material. The locking rib 144 shown has a simple cross section which is easy to mold.

A soft polyolefin alloy can be used as the material for member 68, as it adheres chemically to the surface of the NORYL material and has a shrink rate that is very low (about equal to the NORYL 2.5 mills/inch) so that the forces created during the shrinking process are lower than, for example, pure polyethylene which is about 20 mils/inch.

Figure 14:
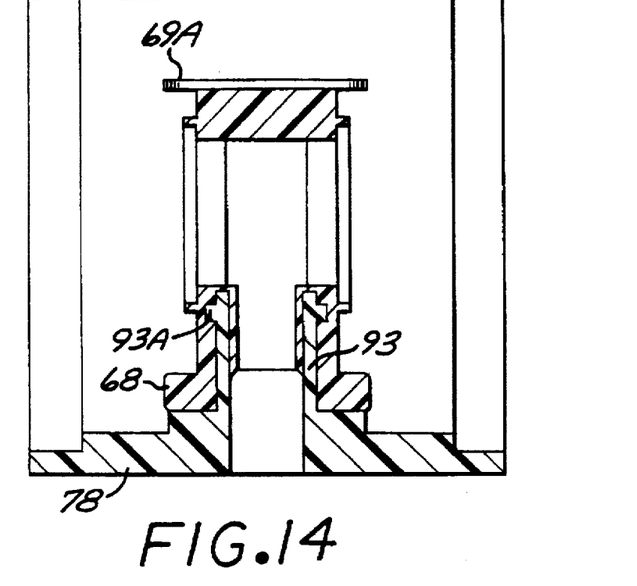
FIG. 14 is a cross-sectional view taken along line 14—14 of FIG. 12.
Figure 15:
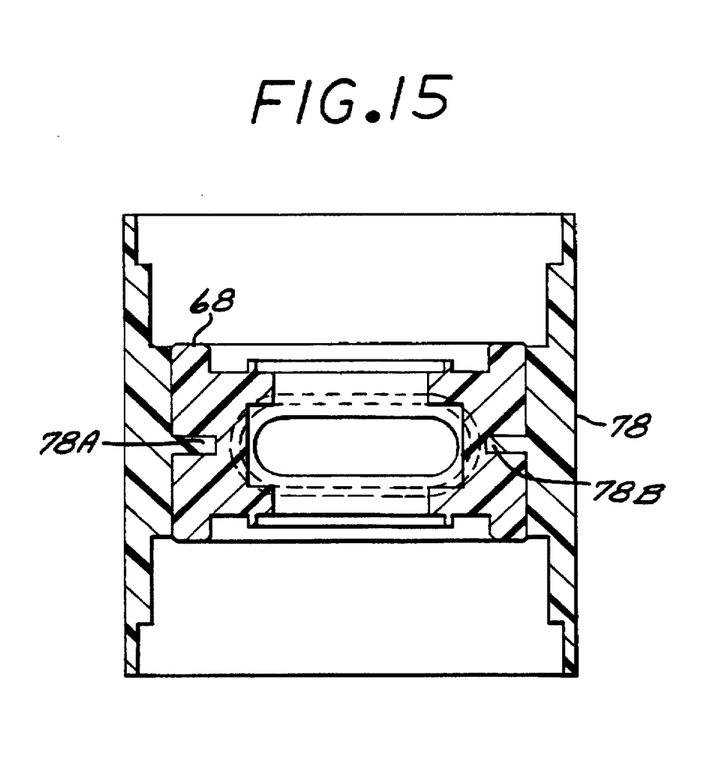
FIG. 15 is a cross-sectional view taken along line 15—15 of FIG. 12.

FIGS. 14 and 15 show the structure of the members 68 and 78 in the snout region in further detail. The material of the inner member 68 flows over the ribs 78A and 78B, and covers the standpipe 93, locking onto the rib 93A.

Figures 16, 17:
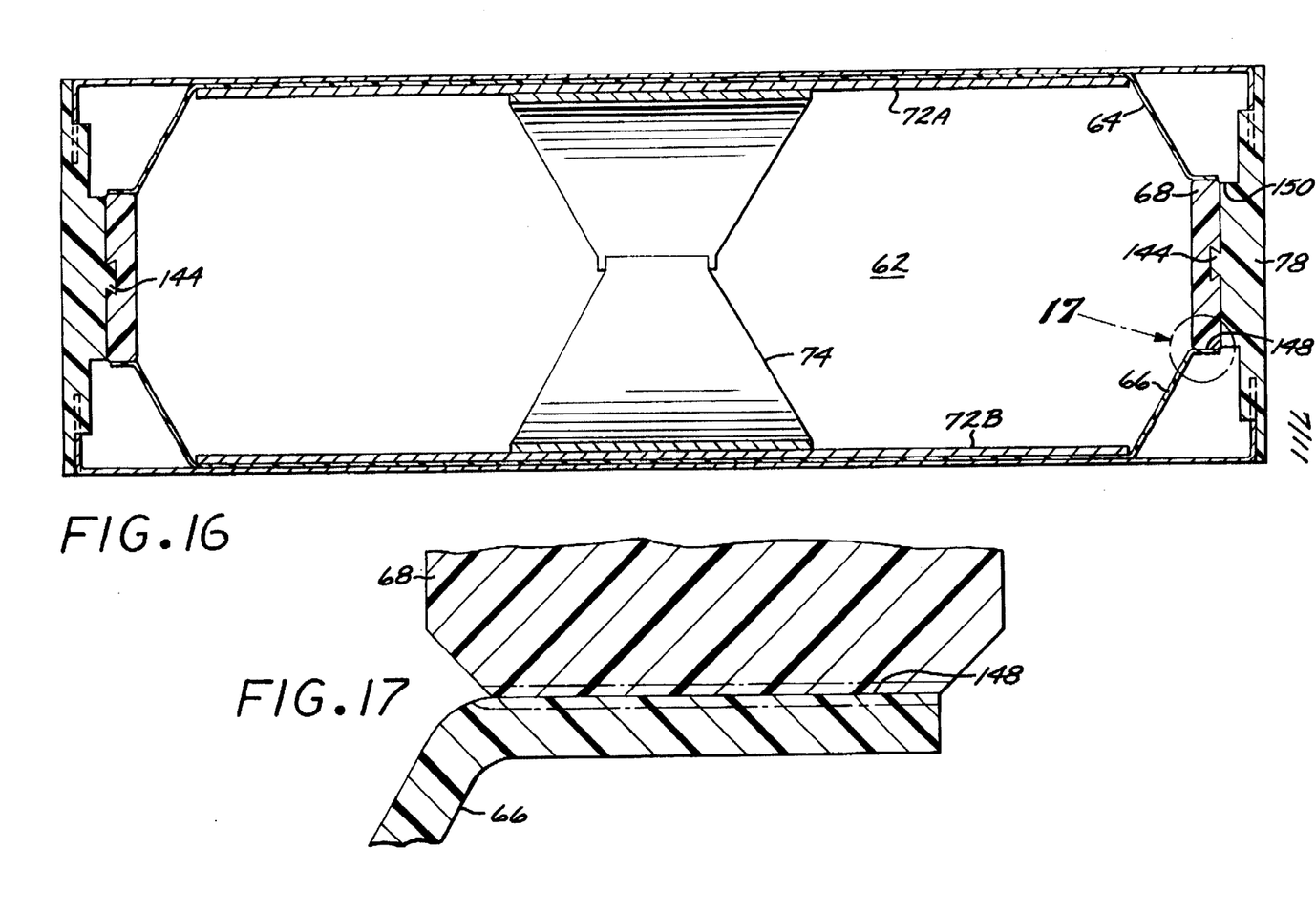
FIG. 16 is a cross-sectional view taken along line 16—16 of FIG. 6.
FIG. 17 is an enlarged view of the region within circle 17 of FIG. 16.

FIG. 16 is a cross-section taken along line 16—16 of FIG. 6. Elements defining the ink reservoir are visible here.

Attachment of the spring bag membranes 64 and 66 to the opposed side surfaces 148 and 150 of the inner member 68 is illustrated. FIG. 17 in particular is an enlarged view illustrating the heat staked attachment of the membrane 66 to surface 148 of the inner frame member 68. Heat staking per se is well known in the plastics art.

Figure 18:
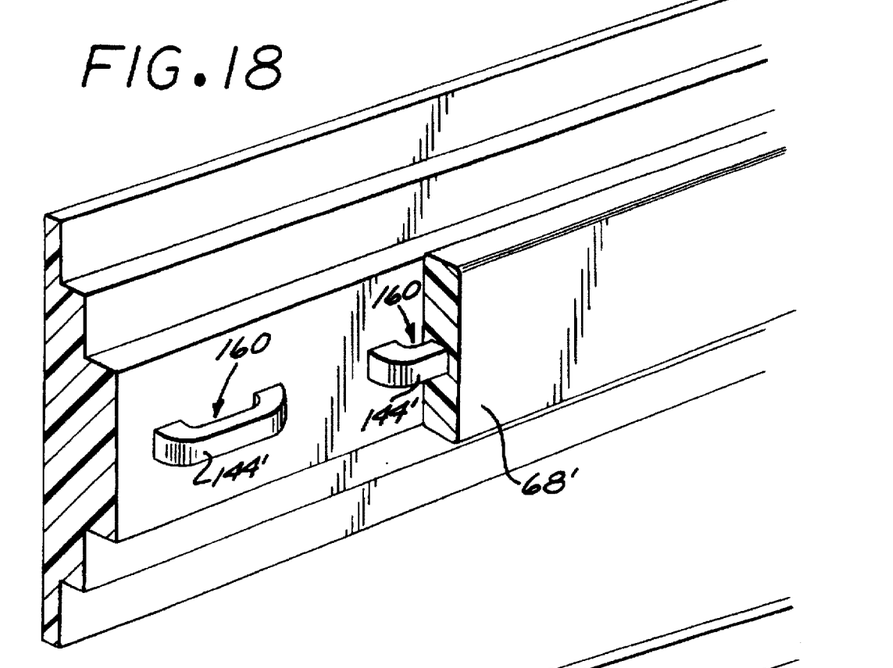
FIGS. 18 and 19 show alternate techniques of locking the inner plastic member to the external plastic member comprising the pen cartridge of FIG. 1.
Figure 19:
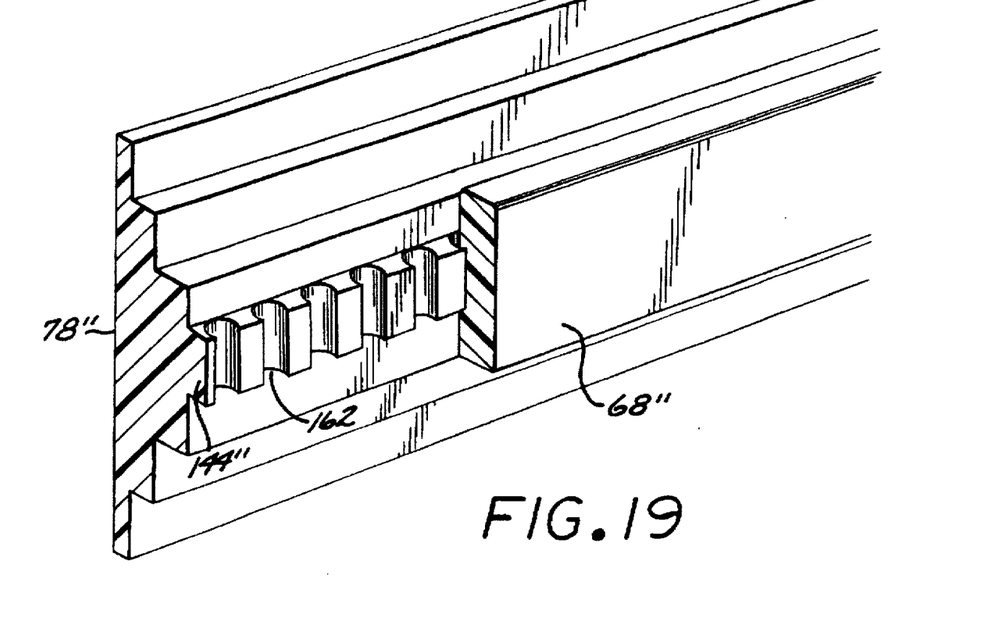

FIGS. 18 and 19 illustrate two alternate embodiments of the locking features which may be formed on the inner surface of the frame member 78, instead of the undercut rib 144. Thus, FIG. 18 shows a frame member 78' which employs locking features 144', essentially small handle-like features with an opening 160 into which the molten plastic flows when the inner member 68' is molded. FIG. 19 shows a frame member 78" which includes locking features 144" which include rounded undercut openings 162 formed therein. The molten plastic flows into the undercut openings 162 when the inner member 68" is molded.

A method of molding the inner member 68 to the outer frame element 78 is described in the referenced application Ser. No. 07/853,372. Briefly, the frame element 78 of modified polyphenylene oxide, i.e., a first molded material is fabricated in a plastic injection mold. This part 78 is referred to as the "first shot." The first shot 78 is next inserted into a second mold where the second molded material is molded onto it. This "second shot" has a degree of shrinkage upon cooling.

An advantage of the two material frame comprising the pen 50 is that the inner frame member 68 can be made of a softer, more ductile material (such as a polyolefin alloy) than the engineering plastic of the exterior member 78, which also acts somewhat as a dampener in the event the pen is dropped. This tends to prevent cracking, membrane tears and other damage. Moreover, a soft, ductile material for the inner member 68, more like rubber than an engineering plastic, is not as prone to stress cracking. Using a polyethylene based material such as a polyolefin alloy to fabricate the inner member 68 has the further benefits of a low moisture transmission rate, thereby maintaining the ink contents of the reservoir against leakage or evaporation, and chemical compatibility with the chemicals constituting the inks used in the pen. The filters 90 and 92 can be readily attached to such materials for the member 68, in contrast to an engineering plastic, since the polyolefin based materials have a lower heat staking temperature, and the material readily wicks into the mesh of the filter, thereby providing a reliable joint between the inner member 68 and the air check valve/filter members 90 and 92.

Figure 20:
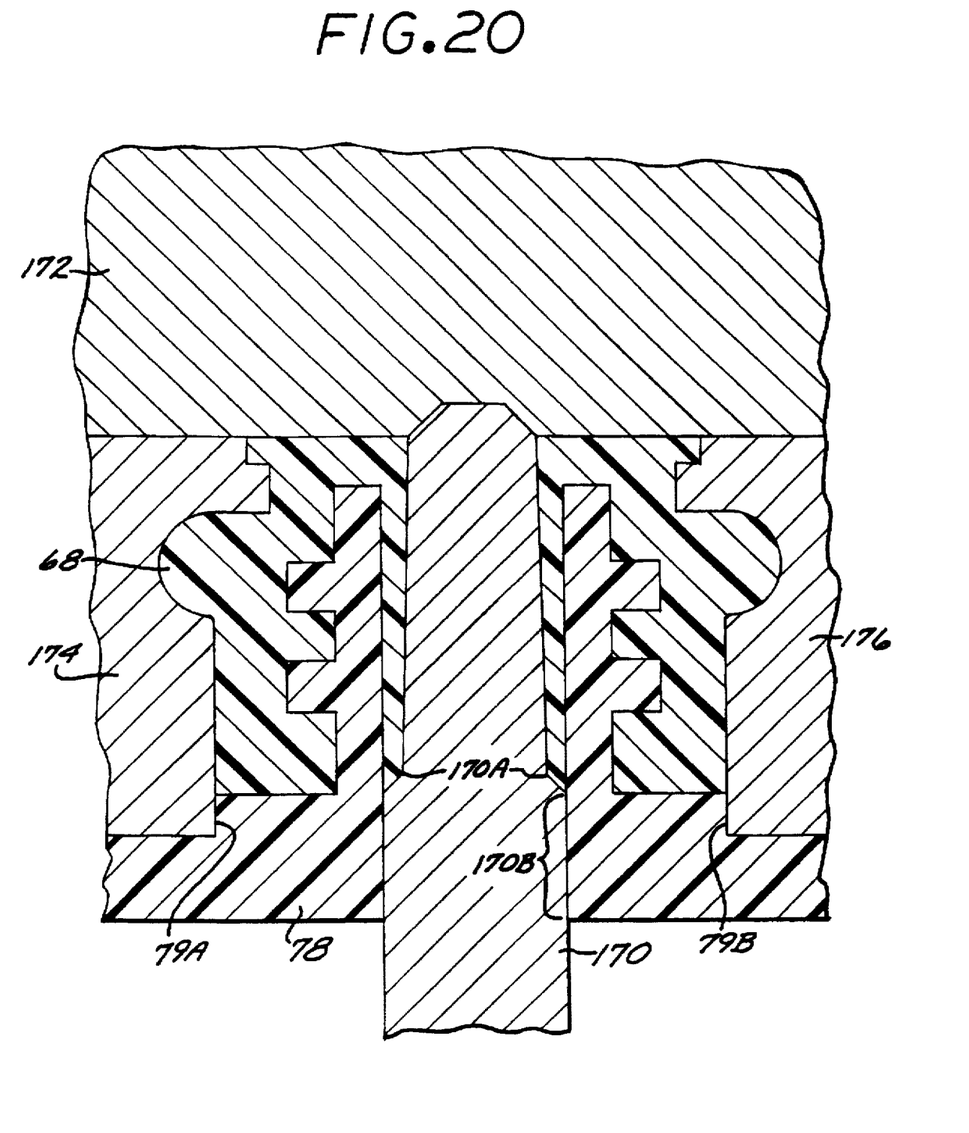
FIG. 20 illustrates the molding of the second shot liner of the standpipe opening.

In the molding of the frame elements 68 and 78, it is necessary to keep the area of the pen between the TIJ printhead 76 and the filter elements 90 and 92 free of particulate contamination that are large enough to block the nozzles of the printhead. In the case of insert molding of the pen as described in the referenced pending application Ser. No. 07/853,872, the core pin defining the standpipe chamber must engage the first shot material which forms element 78 and make a seal tight enough to keep the molten second shot material forming the inner frame member 68, which is under pressure, from entering. The engagement of the core pin on the inside of the standpipe 93 is a source of contamination, as the action of the engagement can cause particles to abrade off the wall of the first shot material and be left behind to later cause a contamination issue. The area of shut off and wiping of the core pin has been minimized by the design of the core pin 170 shown in FIG. 20. In this design, the second shot material forming member 68 is allowed to partially line the inside of the standpipe opening 94 to lessen the wiping action. FIG. 20 shows the two mold halves 174 and 176 which are brought together onto the frame structure 78 to define the mold cavity for the second shot molding of the inner frame member 68 at the snout region 75. The channel pin 172 fits across the mold halves. The mold cavity pin 170 is inserted into the standpipe opening, and its tip is received within a recession formed in the pin 172. The pin 170 is tapered to define an annular space above the shoulder 170A between the pin and the standpipe opening formed in the member 78. The pin 170 fits tightly within the standpipe opening below the shoulder 170A, forming a shutoff area 170B preventing the second shot material from flowing into the area 170B during molding. This pin configuration permits the second shot material to flow into the annular space, forming a lining covering the interior of the standpipe down to the shutoff region 170B. The surfaces 79A and 79B of the external member 78 also serve as shutoff surfaces which are contacted by surfaces of the mold halves, preventing the second shot material from flowing past the joint between the surfaces 79A and 79B and the mold halves.

Another method to minimize the contamination problem is to automate the loading of the first-shot frame element 78 into the mold of the second shot machine. This automation uses a robot loader, which are conventional in the molding industry to place the frames into the second shot mold prior to molding. The frame can be loaded into the robot loader either by hand, by automated feeder systems, or a robot could be used to pick frames out of the first shot molding machine and place them into the second molding machine. All of these uses of automation allows for a better controlled environment which helps to keep the parts clean.

This two material frame may also be produced by the two-shot molding technique, whereby one molding machine has the means for molding the first material, moving that just-molded shot into position for the barrel of the second material, then molding the second material to complete the part. Such two-shot molding processes are known in the art.

In the molding technique described above, the material with the higher melting temperature, the engineering plastic of the external member 78, is first molded in the first shot to form member 78. The material with the lower melting point, the polyolefin alloy or polyethylene based material, is molded next to form inner member 68, using the already molded external member to help define the second shot mold cavity. Alternatively, this molding process may be reversed, with the higher melting temperature material molded over a lower melting temperature inner plastic member in an insert molding process. The interlock features between the frame members 68 and 78 will be formed on the first shot, i.e. the inner plastic member 68, with sufficient undercuts to lock the two materials together. The mold temperature needs to stay near or lower than the melting point of the low temperature first shot. With some engineering plastics, this can make molding them more difficult. Also, as the second shot plastic is molding into the mold and onto the first shot plastic, the first shot will melt along the interface of the plastics. The molding conditions must be such that the first shot maintains its integrity, only being affected along the interface, and not getting washed out as the second shot is molded over the first shot.

Figure 21:
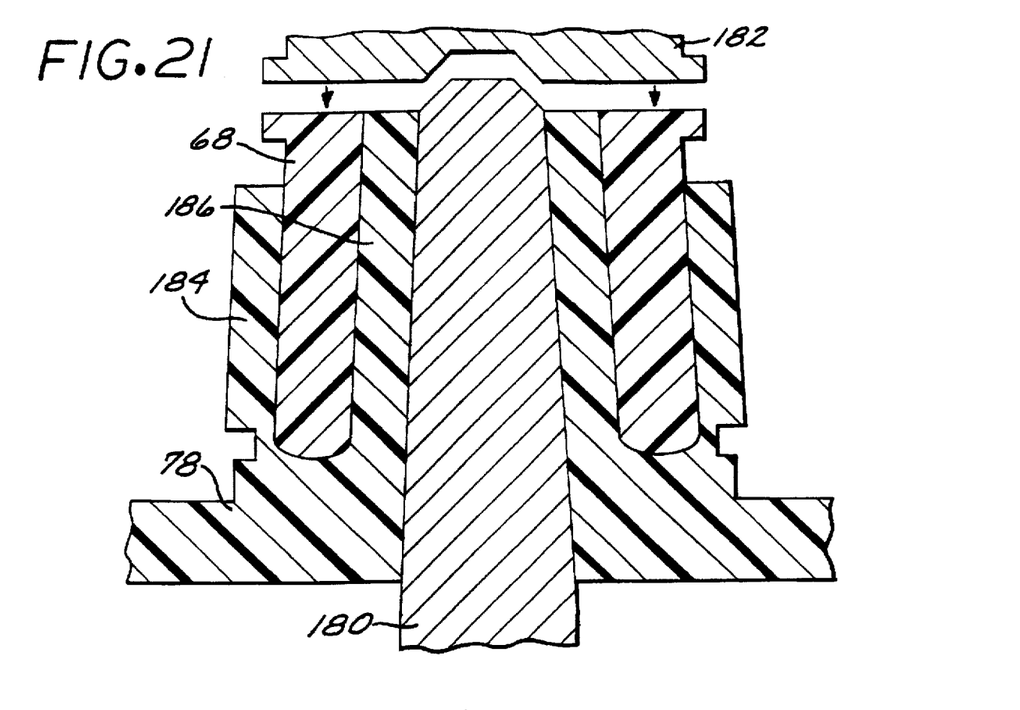
FIGS. 21 and 22 illustrate alternate methods of molding the external and inner frame members comprising the pen cartridge of FIG. 1.

FIG. 21 illustrate such an insert molding process at the area of the standpipe of the pen 50. The member 68 is molded first in a first shot mold. Then, using surface of the member 68 to define some of the second shot mold surfaces, the external engineering plastic member 78 is molded over member 68. A core pin 180 and mold cap 182 define the inner standpipe opening and the top of the standpipe area. An outer ring of 184 of engineering plastic is formed over the first shot plastic 68, forming a compression ring to compress the lower temperature material of member 68 onto the inner standpipe formed by the second shot. As the second shot material cools, it compresses the first shot material against the second shot material at 186 defining the standpipe.

Figure 22:
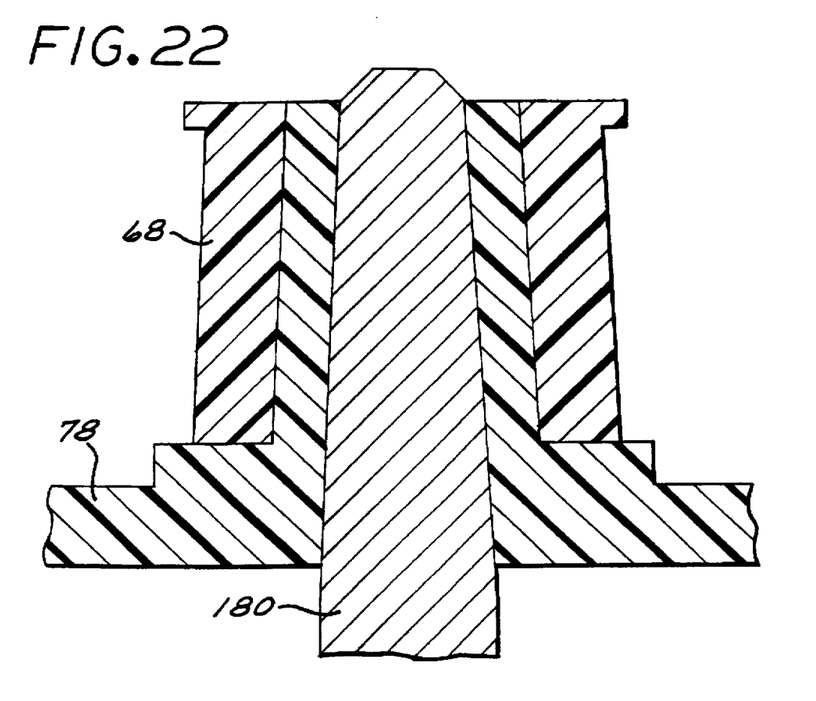

FIG. 22 shows an alternate insert molding configuration for the standpipe, with the lower temperature material molded first. Here the second shot does not define a compression ring about the low temperature material surrounding the standpipe, so that the bonding between the two material is due solely to the chemical bond between the two materials which will be aided as the second shot material will melt the interface and help to cause a better bond than in the case of the molding the lower temperature material last. In that case, the second shot is cooling as it fills the mold and is not as hot in all areas along the joint as is possible in this case, due to the higher temperature of the second shot material and its heat capacity. However, the arrangement of FIG. 21 is superior to that of FIG. 22, as the former arrangement produces both a chemical and mechanical seal.

Such an insert molding process of the high temperature material over the low temperature plastic material has several advantages. A main benefit is in the area of the standpipe. In the molding of the second shot engineering plastic material, the core pin 180 that molds the standpipe opening to the TIJ printhead need only retract from the second shot after molding, and thus eliminates the abrasion problem described above. The core pin 182 in this case must retract, which can cause abrasion, but since the hole it is retracting from was formed by the very same core pin, the fit between the core pin and standpipe is very accurate and leads to less abrasion than in the case where the engineering plastic is the first shot material. In that case, the core pin from the first shot molds the frame 78, then the frame 78 is ejected from the mold, shrinks, and the frame is handled, leading to distortion of the standpipe. Finally, a different standpipe core pin must be lined up and pressed into the standpipe opening in the member 78. In the present case of insert molding the lower temperature material first, the first shot material does not contact the core pin 180. Another benefit of this method is that as the second shot engineering plastic cools, it shrinks onto the inner first shot material producing a tighter joint, whereas in the two shot method where the engineering plastic is first formed, the natural shrinkage of the second shot tends to pull away from the first shot at areas of joinder away from the standpipe.

Another molding process which can be used to fabricate the frame members 68 and 78 is a two-molding process with the higher temperature engineering plastic material molded over the lower temperature polyolefin. When the lower temperature material is molded inside the higher temperature material, as described in the parent application Ser. No. 07/853,372, the first shot part must be carried inside of a core from which it tends to shrink away from and become loose. With this new two-shot molding process, the first shot is molded onto a core which it shrinks onto tightly, and then the second shot is molded over the first shot, and it too shrinks tightly over the first shot.

Figure 23:
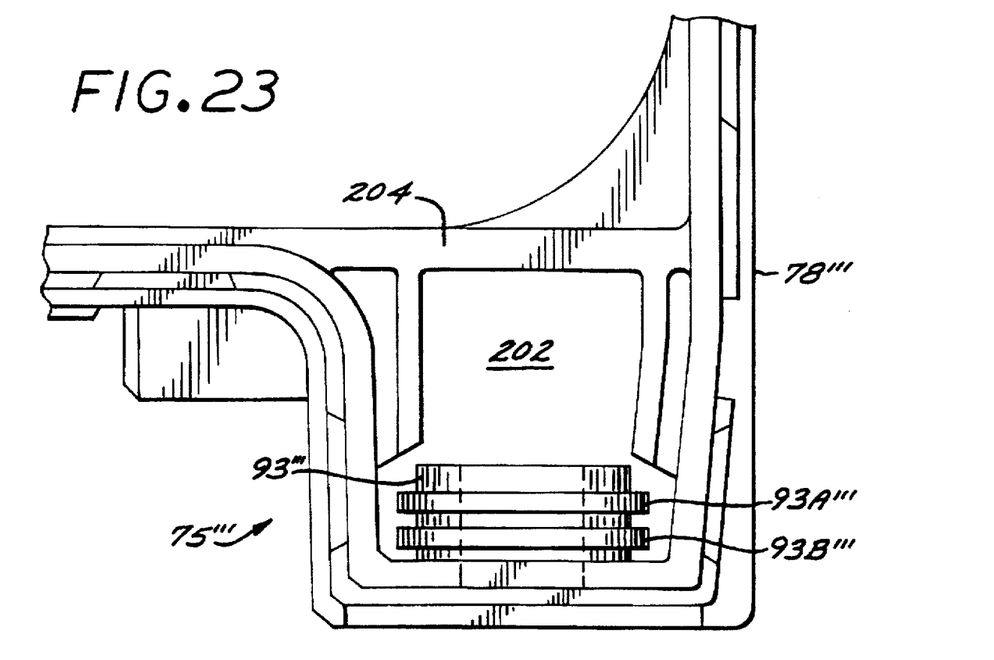
FIGS. 23 and 24 illustrate an alternate embodiment of the frame members at the pen snout region.

FIG. 23 illustrates an alternate embodiment of the snout end of the pen in its form prior to molding the inner plastic member 68 onto the engineering plastic frame member 78. At the snout end 75'", the member 78'" defines an interior, upright fluid standpipe 98'" having an interior opening 94'" defined therein which extends through the standpipe to an opening formed in the exterior surface of the frame member 78'". It is through this opening that the ink will flow from the reservoir to the printhead, which will be positioned at the snout end.

FIG. 2 illustrates the open region 202 surrounding the upwardly extending fluid standpipe 98'" within the frame 78'". A pair of spaced ribs 93A'" and 93B'" protrude from the exterior side of the standpipe 93'". A strut 204 is formed across the throat of the snout 75'" region.

Figure 24:
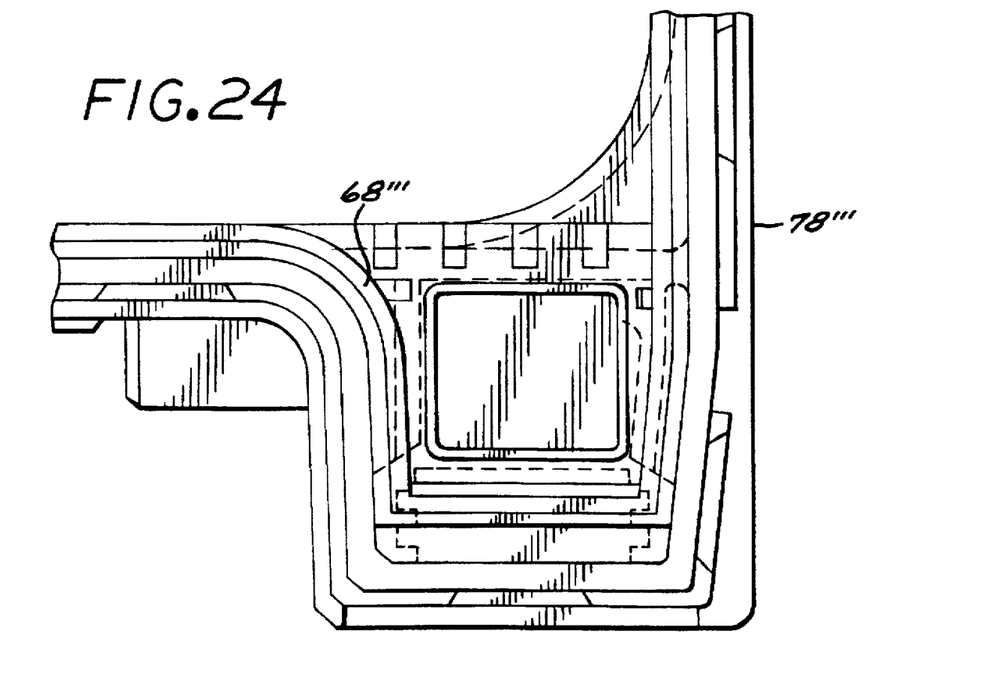

Now referring to FIG. 24, the frame member 78'" is shown with the inner member 68'" molded to the inside surface of the frame member 78'". The material forming the inner member 68'" has been molded around the periphery of the standpipe 98'", without covering the opening 94'", and provides a surface to which the spring bag film membranes may be staked.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A printer ink cartridge including an ink reservoir, comprising:

a frame structure comprising an external frame structural member fabricated from a first rigid plastic material and an interior frame member fabricated from a second plastic material, said interior frame member being attached to said external frame structural member, and wherein said first plastic material and said second plastic materials are different plastic materials;

first and second impervious membranes formed of a third plastic material, said membranes joined to said interior frame member to form, with said frame structure, said ink reservoir;

wherein said second plastic material is compatible with said third plastic material to permit a leak-proof joinder of said membranes to said interior frame member; and an ink-jet printhead connected to said ink reservoir by an ink flow path.

2. The ink cartridge of claim 1 wherein said second plastic material and said third plastic material are compatible such that said membranes are sealed to said interior frame member by application of heat and pressure.

3. The ink cartridge of claim 1 further characterized in that an opening is formed in said external frame structure, said second plastic material of said interior frame member disposed through said opening to provide a passageway extending through said interior frame member and in communication with said ink reservoir, said passageway providing a fill port for filling said ink reservoir with ink, and means for sealing said passageway.

4. The printer ink cartridge of claim 1 further comprising a supply of liquid ink disposed within said ink reservoir.

5. A printer ink pen, comprising:

a frame structure comprising an external frame structural member fabricated from a first rigid plastic material and an inner frame member fabricated from a second plastic material, wherein said first plastic material and said second plastic material are different plastic materials;

said external frame member comprises an inner surface to which said inner member is attached, said inner surface including a plurality of locking features formed therein;

said inner member formed by injection molding of said second plastic material in a molten state, and wherein during said injection molding said molten material flows around said locking features of said external frame member, whereupon said molten material cools and thereby locks said inner frame member to said external frame member at said locking features.

6. The pen of claim 5 further including an ink reservoir, and wherein said external frame member defines a substantially closed loop about said ink reservoir, said loop having an interior facing side, said inner surface extending about at least a portion of said interior facing side.

7. The pen of claim 5 further comprising an ink reservoir and a snout member for carrying printing nozzles thereon, and said inner member extends into the snout to provide an ink path from said ink reservoir to the printing nozzles.

8. The pen of claim 5 wherein said locking features include a protruding rib extending from said inner surface of said external frame member, said rib having undercut sides, wherein during said injection molding, said molten second plastic material flows around said rib against said undercut sides.

9. The pen of claim 5 wherein said locking features comprise a handle-like feature having a handle opening formed therein, wherein during said injection molding, said molten plastic material flows around said handle-like feature into said handle opening to lock onto said external plastic member.

10. The pen of claim 5 further comprising an internal ink reservoir defined by first and second impervious membranes formed of a third plastic material, said membranes joined to said inner member, wherein said second plastic material and said third plastic material are compatible to permit a leak-proof joinder of said membranes to said inner member.

11. The pen of claim 10 wherein said inner member comprises first and second opposed surfaces to which said first and second membranes are joined.

12. The pen of claim 10 wherein said membranes are joined to said inner member by heat staking.

13. The printer ink pen of claim 10 further comprising a supply of liquid ink disposed within said ink reservoir.

14. The pen of claim 11 further comprising an ink fill port comprising a passageway extending through said external frame member and said inner member and between said opposed surfaces in communication with said ink reservoir, and means for sealing said passageway.

15. The pen of claim 14 wherein said ink fill port is defined by an opening formed in said external frame member, said second plastic material of said inner member lining said opening.

16. The pen of claim 15 wherein said passageway is characterized by a circular cross-section of a passageway diameter, and said means for sealing said passageway comprises a spherical member having a diameter larger than said passageway diameter, said spherical member being press fitted into said passageway to provide a seal.

17. The pen of claim 16 wherein said first opening is characterized by a first diameter adjacent an external surface of said external member and by a second reduced diameter adjacent an interior surface of said external frame member, thereby defining a stop shoulder to prevent said spherical member from passing through said passageway into said ink reservoir.

18. A printer ink pen, comprising:

a frame structure comprising an external frame structural member fabricated from a first rigid plastic material and an inner frame member fabricated from a second plastic material, and wherein said first plastic material and said second plastic materials are different plastic materials;

a printhead supported by said frame structure;

said external frame member comprising an inner surface to which said inner member is attached;

means for securing said external frame member and said inner frame member together, comprising a first set of features formed on said inner surface of said external frame member and a second set of features formed on a surface of said inner member for securing to said external frame member, wherein features of said first set mechanically interlock with features of said second set.

19. The pen of claim 18 wherein said inner member is formed by injection molding of said second plastic material in a molten state, and wherein during said injection molding said molten second material flows around said first set of features of said external frame member, whereupon said molten material cools, forming said second set of features which are interlocked with said first set of features.

20. The pen of claim 18 wherein said external member is formed by injection molding of said first material in a molten state, and wherein during said injection molding said molten first material flows around said second set of features of said inner member, whereupon said molten material cools, forming said first set of features which are interlocked with said second set of features.

21. The pen of claim 19 wherein said first set of features comprises a rib member protruding from said inner surface and having undercut sides.

\* \* \* \* \*